United States Patent [19]
Lippel
[11] 3,739,082
[45] June 12, 1973

[54] ORDERED DITHER SYSTEM

[75] Inventor: Bernard Lippel, West Long Branch, N.J.

[73] Assignee: The United States of America as represented by the Secretary of the Army, Washington, D.C.

[22] Filed: Feb. 29, 1972

[21] Appl. No.: 230,375

[52] U.S. Cl. ................................ 178/6, 178/DIG. 3
[51] Int. Cl. ............................................ H04n 7/12
[58] Field of Search ..................... 178/6, 6.8, DIG. 3

[56] References Cited

UNITED STATES PATENTS 3,244,808 4/1966 Roberts ......................... 178/DIG. 3
3,562,420 2/1971 Thompson ..................... 178/DIG. 3

*Primary Examiner*—Howard W. Britton
*Attorney*—Harry M. Saragovitz, Edward J. Kelly, Herbert Berl et al.

[57] ABSTRACT

An improved system for transmission of either still or moving pictures, with or without scan interlace, and using only coarse quantization of the picture luminance, for conserving transmission channel capacity. This improvement is accomplished by combining the picture with a novel, two-dimensional ordered dither pattern. This pattern is arranged so that, without requiring expensive and complex synchronous subtraction of the dither signal at the receiver, and while operating with coarse quantization, a picture having relatively few disturbing noise structures, and of generally better quality, can be obtained than has been possible with dither systems heretofore. In addition, the dither pattern can be oriented so as to provide negligible large area flicker in those scanning systems which use line interlace. Finally, a reduction in aliasing effects, as well as further reduction in regular noise artifacts visible to the eye with ordered dither, can be achieved by causing the dither pattern to vary as a function of time.

12 Claims, 2 Drawing Figures

ORDERED DITHER SYSTEM

Figure 1:
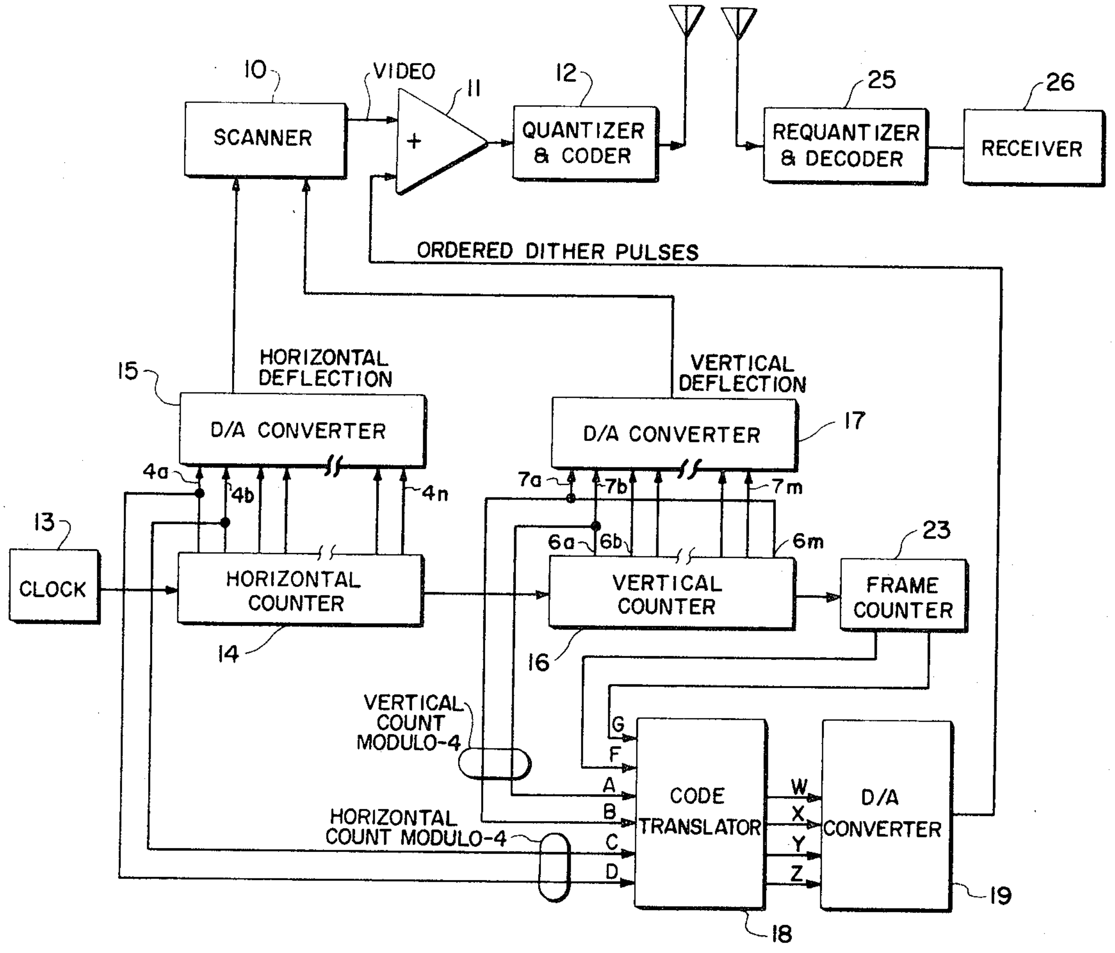

Pictures which are transmitted by digital communication means are generally sampled and quantized. Especially in the case of television transmission, it is desirable that the number of samples sent for each picture (i.e., each television frame) be as few as practicable and that the luminance of each sample also be quantized as coarsely as practicable. The present invention is an improvement over prior art systems in which a dither signal is added to the picture at the transmitter (and sometimes also subtracted from the picture at the receiver) in order to permit coarser quantization than would otherwise be subjectively satisfactory to a human viewer at the picture receiver.

To illustrate, we may consider a television system in which a raster of approximately 500 lines is scanned 30 times each second (frame rate of 30 frames per second), corresponding roughly to standard U. S. broadcasting practice. For pulse code modulation (PCM) encoding, each scanned line may be assumed to be represented by a series of 500 $k$-bit binary numbers, each such binary number (or "word") corresponding to one picture sample point lying on the scanned line. It will be apparent that an entire frame of the TV picture is represented by approximately 500×500, or 250,000 samples and that the transmission of television pictures requires $250{,}000\times 30 = 7.5\times 10^6$ samples to be sent each second. This illustrates the sampling effect.

In the case of ordinary PCM, a $k$-bit binary number is sent for each sample ($k$ is an integer) to indicate the picture luminance at such sample point. Thus, only $2^k$ discrete luminance values can be represented, even though a larger number of values may be distinguishable in the original picture. This illustrates the quantizing effect of PCM.

In the case of simple PCM, it is generally agreed that the integer $k$ should be at least 6 in value to insure a subjectively satisfactory picture. Thus, in the assumed case, at least $6\times 7.5\times 10^6 = 45\times 10^6$ bits/second would have to be transmitted. This is usually an inconveniently high signalling rate. In general, where $L^2$ samples are sent per frame, $F$ frames are sent per second and k bits are sent per sample, the signalling rate, $R$, is $$R = FkL^2 \text{ bits/second}$$

and it is desirable to use the lowest practicable values of $F$, $k$ and $L$, in the case of straightforward PCM, so as to minimize the signalling rate $R$.

Various so-called compression schemes have been devised which process a PCM signal in such a way that considerably less than $45\times 10^6$ bits/second )or more generally, $FkL^2$ bits/second, where $F$ is the frame repetetion rate) may be transmitted, and a satisfactory picture nevertheless is reconstructed at the receiver. Some of these systems permit even less channel capacity than the present invention, but they require complex special equipment to be added at both transmitter and receiver. On the other hand, the present invention requires only minor additional circuitry to be added to a conventional PCM transmitter (somewhat compensated by permitting a coarser analog-to-digital converter or other quantizer) and only a conventional PCM receiver, or in some cases, even a conventional analog receiver.

The present invention is an improvement on prior art systems for reducing the required value of $k$ by adding a dither signal to the video signal.

Prior art systems of dither coding have been developed wherein a low amplitude perturbation signal, called "dither," is first added to the video signal obtained by scanning the picture before quantization, to improve the subjective appearance of a coarsely quantized picture so that fewer than 6 bits per sample can be tolerated. For example, L. G. Roberts, in an article entitled "Picture Coding Using Pseudo-Random Noise" on pp 145–154 of the February 1962 issue )IT-8, No. 2) of the IRE Trans. on Infor. Theory, described such a system, using an essentially random dither signal derived from a pseudo-random number generator, and showed that for a given picture quality, a further decrease can be made in the required value of $k$ by also subtracting from each received picture sample exactly the dither added at the transmitter. J. E. Thompson and J. J. Sparkes, in an article entitled "A Pseudo-Random Quantizer for Television Signals," appearing on pages 353–355 of the March 1967 (Vol. 55, No. 3) issue of Proc. IEEE, have described an improvement of the Roberts system, using a dither signal which is the sum of two components, the first of which alternates between two possible values in a highly regular manner, and the second of which is a pseudo-random dither similar to that of Roberts; the regular dither component is alternated on successive picture frames, so that the two-dimensional visible pattern corresponding to only this component reverses on successive frames and would not be perceptible to the eye. Thompson and Sparkes report satisfactory television pictures with only 2 bits per picture sample, corresponding to only $2^2$ or four levels of luminance quantization per sample.

A major disadvantage of the prior art systems of both Roberts and Thompson et al. stems from the need for synchronizing a first pseudo-random dither generator at the transmitter and a second similar pseudo-random generator at the receiver. These two dither generators are required in order to provide synchronous dither subtraction at the receiver, which, unless the number of bits per sample is increased, is necessary to prevent serious deterioration of the picture quality.

By contrast, the ordered dither coding system of the present invention provides a better picture than prior art systems, for a specified low value of $k$, even when the latter systems include dither subtraction at the receiver. Although dither subtraction can also be provided with the present invention, the improvement is so slight that usually it is not worthwhile. When operated without dither subtraction at the receiver, the invention provides a much simpler and more efficient system than has previously been necessary for acceptable quality.

The dither of prior systems, as well as that of the invention, consists of electrical pulses (dither pulses) having a number Q of discrete and equi-probable amplitude values which are uniformly distributed in a range of amplitudes equal to the quantizer step interval S, assuming a uniform quantizer.

The invention will be described for values of $Q$ equal to 16 or 8, and dither chosen such that the average value of dither is always zero. The actual set of 8 possible dither pulse amplitudes (levels), therefore, for $Q$=8, will be $S/Q = S/8$ multiplied by the following eight factors: −3.5, −2.5, −1.5 . . . +1.5, +2.5, +3.5, where $S$ is the quantizer step interval. Likewise, the 16 possible levels for $Q$=16 are formed by multiplying $S/16$ by the following 16 factors: −7.5, −6.5 . . . +6.5, +7.5. According to the prior art, the equi-probable dither levels referred to above will occur in wholly or partially random arrangements relative to the picture.

In the discussion to follow, each of the possible dither values for $Q$=8 will be represented only by positive integers 0 to 7 obtained by adding +3.5 to the corresponding values −3.5 . . . +3.5, assuming $S/Q$=1. Likewise, for $Q$=16 the integers used to represent possible dither values are 0 to 15, obtained by adding +7.5.

Although these dither pulses of varying amplitude occur as a single train of pulses in the time dimension, the effect of scanning at transmitter and receiver is such that this train of pulses is converted into a two-dimensional dither pattern which effectively is superimposed on the two-dimensional input picture.

In accordance with the present invention, ordered dither patterns, wherein a small, subpattern is repeated horizontally and vertically, are preferred to the pseudo-random patterns used by Roberts or the combination of regular and pseudo-random patterns used by Thompson and Sparkes.

Also, in accordance with the invention, a preferred type of dither pattern coextensive in area with the entire picture is based upon a class of repeated subpatterns or matrices which will be called "nasiks." When $Q$=16, the nasik matrix is a pandiagonal magic square; when $Q$=8, a given integer is repeated twice within the 4×4 matrix, but the rows, columns and diagonals have constant sums, in the manner of a pandiagonal magic square. Any ordered dither pattern in which the repeated subpattern is a nasik will be called a nasik dither pattern.

When $Q$=16, a preferred dither subpattern or dither matrix is shown in Table I. Three of many other equally effective variations of the above dither patterns are shown in Tables II and III and IV.

Table I

| | | | |
|---|---|---|---|
| 0 | 11 | 12 | 7 |
| 14 | 5 | 2 | 9 |
| 3 | 8 | 15 | 4 |
| 13 | 6 | 1 | 10 |

Table II

| | | | |
|---|---|---|---|
| 8 | 3 | 4 | 15 |
| 6 | 13 | 10 | 1 |
| 11 | 0 | 7 | 12 |
| 5 | 14 | 9 | 2 |

Table III

| | | | |
|---|---|---|---|
| 4 | 15 | 8 | 3 |
| 10 | 1 | 6 | 13 |
| 7 | 12 | 11 | 0 |
| 9 | 2 | 5 | 14 |

Table IV

| | | | |
|---|---|---|---|
| 12 | 7 | 0 | 11 |
| 2 | 9 | 14 | 5 |
| 15 | 4 | 3 | 8 |
| 1 | 10 | 13 | 6 |

It will be noted that, with the $Q$=16 matrices of Tables I to IV, the sum of the 4 integers disposed in any row, or column is 30. Moreover, the sum of the 4 integers in any 2×2 subsquare also is 30. Finally, the sum of the 4 integers in any diagonal, including broken diagonals, such as 6, 15, 9, 0 or 6, 3, 9, 12 in Table I, all must be 30. It should be understood that the sum of 30 mentioned above corresponds to a sum of 0 for actual dither amplitudes, since 4×−7.5 = −30. More generally, there are 32 groups of four matrix elements consisting of 4 rows, 4 columns, 16 diagonals of both positive and negative slope and including broken diagonals, and 16−2×2 subsquares, including the marginal subsquares such as 0, 13, 10, 7 and 9, 4, 3, 14 of Table I which have the same sum.

It has been found that there is no requirement for dither subtraction at the receiver if the dither pattern is such that the sum of any four dither pulse amplitudes forming a 2×2 subsquare is equal to zero. The preferred nasik patterns of the invention always satisfy this condition.

Comparing the two nasik dither patterns formed by cyclical repetition, both horizontal and vertically, of the dither matrices shown in Tables I and II, it will be noted that the columns such as 0, 14, 3, 13, 0, 14, 3, 13 . . . are identical except for a translation of elements consisting of a horizontal shift of one element and a vertical shift of two elements. The rows, on the other hand, are both shifted and reversed in relation to one another, as by reflection in a mirror; for example, the row 0, 11, 12, 7, 0, 11, 12 . . . becomes 0, 7, 12, 11, 0, 7 . . .

It will be clear that the two dither patterns formed by the subpatterns of Tables I and II are related merely by a reflection and a translation. A transformation wherein columns, rather than rows, are reflected is permissible. It will be clear to those skilled in the art that repositioning of the dither pattern corresponding to translations (horizontal, vertical or oblique), and to reflections about a horizontal or vertical axis do not materially affect the relevant properties of the dither pattern. Rotations of the pattern by ±90 degrees would, also be acceptable, except when 2:1 interlaced scanning is used, to be discussed later. The matrix derived by this 90° rotation can be referred to as a transpose of the original matrix. Since the complete dither pattern consists of a repetitive and continuous aggregate of many identical and separate matrices, the exact bounds of a given 4×4 matrix will obviously depend upon the orientation of the observer and the starting reference point for the matrix.

A different species of dither pattern, slightly less desirable than that of Tables I to IV, corresponds to the interchange of some rows and columns of any of the matrices of Tables I to IV with 2×2 subsquares. This species is illustrated in Table V.

Table V

| | | | |
|---|---|---|---|
| 0 | 14 | 5 | 11 |
| 13 | 3 | 8 | 6 |
| 10 | 4 | 15 | 1 |
| 7 | 9 | 2 | 12 |

All matrices such as those of Tables II, III and IV which can be derived from the matrix of Table I by only translations and by reflections about horizontal and vertical axes, but not including 90° rotations (transpositions) will be considered to be as equivalent matrices. Similarly, there exist another set of equivalent matrices which include that of Table V and those derived therefrom in the same manner as described for the first species. In addition, there are at least two more sets of equivalents, in accordance with this definition, namely, the transposes of the matrices of the two sets of aforesaid equivalents.

Logical equations suitable for generation of the matrices of Tables I to IV will be given later and can be used to further define the matrices.

The addition of ordered dither in accordance with the invention permits the use of a relatively coarse quantizer. The quantizer can be an analog-to-digital converter, such as one putting out 2 or 3 binary digits, corresponding to four or eight quantized usually levels, or a single pulse quantized with four to eight levels may be sent. When a single pulse is sent, there is no substantial increase in bandwidth over that needed for an analog signal of comparable quality. Shades of luminance intermediate those corresponding to the quantizer output levels are approximated by patterned mixtures of lighter and darker dots where luminances correspond to two adjacent quantizer levels, some of the dots being darker than the represented input picture area, the others lighter; and, if the uniform picture area is much larger than 4×4 picture elements, the pattern of lighter and darker dots is formed by repetition of a 4×4 subpattern and repeated like the dither subpattern.

Conventional television systems use 2:1 line-interlaced scanning such that two successive "fields" are required for reception of all lines of the picture. During every other field (comprising what one may call the set of "odd fields") only odd-numbered lines of the picture raster are scanned and during the intervening fields, (which one may call the "even fields"), the remaining or even-numbered lines of the raster are scanned. As is well known, the eye is much less sensitive to flicker of very small spots and fine lines than to flicker of larger areas. Thus, the eye fuses the two fields of a 2:1 interlaced scanning raster, and even though any single scanning line (which may be very bright) actually flickers on and off only 30 times per second, its flicker is not observable.

Referring to any patterned mixture of lighter and darker dots approximating a luminance value which does not correspond to a quantizer output level, the number of lighter dots scanned during one interlaced field may not be the same as the number of dots scanned during the second field. For this reason, certain picture areas will not have exactly the same average luminance during each field and may be seen to flicker 30 times per second (assuming U.S. scanning practice). In order to suppress such large-area flicker at 30 Hz, it is necessary to insure that, for any fixed value of input picture luminance, the total number of brighter dots produced on even-numbered scanning lines of the picture raster (i.e., during even fields) is substantially the same as the number of brighter dots produced on the odd-numbered scanning lines which are therebetween (i.e., during odd fields).

Given a certain input luminance value, whether or not a brighter dot appears depends upon the amplitude of the dither pulse which is generated for the point in question. Furthermore, if a dither sample is sufficient to produce a brighter dot (localized brightening of the output picture), any more positive value of dither (represented by a larger integer on the dither matrix) will, in its turn, likewise produce a brighter dot.

For example, assuming 16 dither amplitudes, let the luminance in a picture area be uniform at such value that a brighter dot is produced when the dither sample has amplitude 11, but not when the dither amplitude is 10. Then brighter dots will also appear when the amplitude is 12, 13, 14 or 15. In other words, every square of 4×4 elements in the area under consideration will have five brighter dots, since every square contains 16 different dither amplitude values.

In order that the 30Hz large area flicker accompanying 2:1 scan interlace be suppressed, half of the brighter dots, of any 4×4 square should be located on odd-numbered scan lines and half on even-numbered scan lines; this condition manifestly is impossible when the number of brighter dots per square is an odd number. However, the division can be made as even as possible, for example, two brighter dots per square on odd fields, three brighter dots per square on even fields.

From these remarks, it is evident that some nasik dither matrices, although suitable in the absence of scan interlace pictures, would produce some large area frame rate flicker (30Hz for U. S. television) when the scanning raster has 2:1 interlace. This problem associated with 2:1 scan interlace can be minimized if the successive pairs of dither elements (0, 1), (2, 3), (4, 5) . . . (12, 13) and (14, 15) are distributed over the matrix so that each such pair is located on two rows of the nasik matrix having different odd or even parity. That is to say, if, for example 2, corresponding to one member of a pair appears on either a first or third horizontal scan line of the matrix, the other member of that pair, namely 3, should be disposed on either the second or fourth row. (assuming that the conventional horizontal raster scan is employed).

The matrices of Tables I to IV satisfy the last-mentioned condition required for systems using 2:1 scan interlace. On the other hand, if Table I is rotated 90°, so that the raster scan occurs along rows which are shown as columns in Table I, the 30Hz flicker due to interlace is much larger. For example, when exactly four brighter dots appear in the 4×4 square, they are located at positions 12, 13, 14 and 15 which would all appear in the first and third rows of the rotated matrix (columns of Table I) and thus, would all occur in the same field of the raster.

Table VI shows the row parity distribution of the successive elements of the nasik matrix of Table 1.

TABLE VI

| Element value | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|
| Row | 3 | 2 | 4 | 1 | 1 | 4 | 2 | 3 | 1 | 4 | 2 | 3 | 3 | 2 | 4 | 1 |
| Row parity | O | E | E | O | O | E | E | O | O | E | E | O | O | E | E | O |

It will be noted that there is no requirement that the parity row distribution be E. O. E. O. etc., where E is even and O is odd; it is sufficient that successive pairs like (0, 1), (2, 3), etc. be on rows of different parity.

As previously mentioned, 4×4 dither matrices having $Q=16$, may still have a very slight dot unbalance between odd and even interlaced scan fields for certain values of local picture luminance. The large area frame rate flicker accompanying dither systems with 2:1 scan interlace actually can be reduced to zero if the $Q$ of the 4×4 nasik dither picture is 8, that is, if only eight discrete values of dither are used and each dither element is used twice on the 4×4 matrix, once on an even-parity line and once on an odd-numbered line. An example of such a nasik dither matrix in which each dither value occurs on both fields, is given in Table VII. The constant sum in all sets of four elements of the matrix of Table VII is 14, rather than 30 as in the case of the 16-valued matrix of Table I. This sum is characteristic of 4×4 nasik dither matrices having only eight dither values. It will be noted of the nasik matrix of Table VII that the same dither element appears twice, always on rows of opposite parity and, therefore, that the luminance contributions thereof will always appear on alternate picture fields.

The nasik matrix of Table VII ($Q=8$) can be derived from that of Table I (where $Q=16$) by writing the numbers of the latter in base-two notation (i.e., each number having four binary bits) and by consistently deleting from each of the binary numbers the least significant digit. For example, the binary form for 0, 11, 12, 7 in the first row of the matrix of Table I is 0000, 1011, 1100 and 0111. By dropping the least significant digit, one obtains 000, 101, 110 and 011, corresponding to the numbers 0, 5, 6 and 3, respectively. Another, equivalent, procedure for deriving the $Q=8$ nasik matrix of Table VII from that of Table I is to divide each number of the matrix of Table I by two, discarding fractions, if any. It is also possible to derive other $Q=8$ nasiks from the $Q=16$ nasik of Table I, for example, by writing the numbers of the latter nasik in binary form, as before, and deleting any one of the other three binary digits. The matrices of Tables VIII, IX and X are derived by deleting only the least significant digit and using the matrices of respective Tables II, III and IV instead of Table I.

Table VII

| | | | |
|---|---|---|---|
| 0 | 5 | 6 | 3 |
| 7 | 2 | 1 | 4 |
| 1 | 4 | 7 | 2 |
| 6 | 3 | 0 | 5 |

Table VIII

| | | | |
|---|---|---|---|
| 4 | 1 | 2 | 7 |
| 3 | 6 | 5 | 0 |
| 5 | 0 | 3 | 6 |
| 2 | 7 | 4 | 1 |

Table IX

| | | | |
|---|---|---|---|
| 2 | 7 | 4 | 1 |
| 5 | 0 | 3 | 6 |
| 3 | 6 | 5 | 0 |
| 4 | 1 | 2 | 7 |

Table X

| | | | |
|---|---|---|---|
| 6 | 3 | 0 | 5 |
| 1 | 4 | 7 | 2 |
| 7 | 2 | 1 | 4 |
| 0 | 5 | 6 | 3 |

As previously mentioned, shades of luminance intermediate to the luminance values which the quantizer would provide without dither are represented, when ordered dither is employed, as in the invention, by fine mixtures of brighter and darker dots on the output picture. The pattern structure of such dots is an artifact and, if perceptible, is seen as noise. However, the visibility of these dots is limited by low contrast, since brighter dots are only one quantizer step lighter than the darker dots. If the scanning raster has many closely placed samples, the size of the dither matrix (for ordered dither) is correspondingly small relative to the picture and likewise the pattern of noise is very fine and hard to see; however, if the density of raster samples is then reduced, in order to minimize the required signalling channel capacity, the spatially extended noise pattern becomes more visible, even though low in contrast. In such case, it may be advisable to use different dither patterns for successive television frames, alternating between two (or more) dither patterns selected in such a manner that, when the eye fuses the superimposed noise patterns, similar to the fusing of interlaced fields, the eye receives an impression of a single, more finely spaced, and, hence less visible, pattern of dots.

For example, the dither patterns specified by the matrix of Table I may be displaced two elements horizontally every time the frame changes, which is the same as alternating back and forth, since the dither pattern repeats with a cycle of four picture elements horizontally. When this is done, some individual dots may flicker at only half the frame rate, or 15 per second in the case of TV broadcast standards. Unlike the situation with broad area flicker, previously discussed, the low-contrast flicker of isolated small dots, would be perceived with difficulty, if at all.

An effect better than that of the simple pattern displacement is obtained by alternating between certain of the nasik patterns defined by the set of matrices in Tables I-IV or the set in Tables VII-X. If only two alternating dither patterns are used and $Q=16$, one suitable pair of dither patterns is defined by Table I and Table II and another suitable pair of patterns is defined by Tables III and IV. Alternatively, the set of all four patterns defined by Tables I, II, III and IV may be used, preferably in the named sequence or else in the reverse sequence, IV, III, II, I.

If $Q=8$ and only two alternating patterns are used, a suitable pair corresponds to Tables VII and VIII (or Tables IX and X); and, for four alternating dither patterns, the sequence which corresponds to Tables VII, VIII, IX, and X may be employed to advantage.

It will be understood by those skilled in the art that, although specific matrices of numbers have been used to explain and assist the construction of preferred embodiments, other equivalent sets of nasik matrices could also have been used. Furthermore, other combinations of plural nasik dither patterns (for example, a set of two patterns corresponding to Tables II and III, or to the Table I pattern alternating with its own lateral displacement by two columns) also produce some better effects than a single nasik dither pattern, although the improvement may be less than when the preferred combinations of patterns referred to above are used.

It has already been explained that the nasik dither patterns are preferred because dither subtraction is unnecessary and (provided the pattern is suitably oriented) because 2:1 interlace does not produce flicker. A further advantage of these patterns is that artificial patterns of lighter and darker dots (which are produced in picture areas whose luminances do not correspond to quantizer output levels and which are called "noise patterns") have relatively low subjective visibility compared to the noise patterns resulting from many other patterns of dither. Finally, the visibility of noise patterns may be further reduced effectively by temporal alternation between equivalent nasik dither patterns. The visual fusion of suitably displaced noise patterns also fuses aliasing patterns which occasionally result when fine picture details which the quantizer would suppress in the absence of dither, have high spatial frequencies. Thus, dither which varies from frame to frame has the effect of increasing the maximum picture spatial frequencies which can be reproduced without aliasing (i.e., visual fusion increases the effective spatial sampling rate for details brought out by dither only).

FIG. 1 shows a PCM system of the prior art modified to operate in accordance with the present invention.

In accordance with prior art, a scanner 10, which may be a television camera, generates a video signal. This video signal is combined with a dither signal in adder 11 and their sum, appearing at the output of adder 11 is quantized and coded in the quantizer and coder unit 12. Typically, the unit 12 is an analog-to-digital converter and provides a PCM signal corresponding to the video signal from the scanner 10, but in some cases only one pulse having several possible values is put out for each picture sample. The scanner 10 scans the image by means of a conventional scanning raster, preferably, but not necessarily, with the usual 2:1 line interlace. Since the preferred system for providing digital raster scan is well known to persons skilled in the art, and is not part of the invention, it will be described rather briefly.

Horizontal deflection signals for the scanner are derived by means of a clock pulse generator 13 which generates a continuous train of pulses, a horizontal counter 14 and an associated digital-to-analog converter 15. The counter 14 preferably is a binary counter; if it includes some counting stages which are not binary, it is preferred that at least the first two input stages count in the base two, for reasons which will be apparent subsequently.

Assuming a binary horizontal counter 14, an output from each counter stage is connected, in turn, to a corresponding input of the binary digital-to-analog converter 15. The output of the horizontal counter 14 is a number which increases uniformly to a maximum, then returns to zero and repeats its cycle. When converted into an electrical sweep signal by the digital-to-analog converter 15, the counter output provides a horizontal deflection signal which has an approximately sawtooth form, but more exactly it is a repetitive staircase current or voltage signal so that the scanning beam hesitates at each of a series of horizontal points instead of travelling with uniform horizontal velocity. Thus each line of the picture is sampled on an array of points. The *n*-stage horizontal counter 14 has output leads 4*a*, 4*b* . . . 4*n*. If $n$=7, for example, the number of sample points per each scanning line then would be 128.

In accordance with prior art, the last stage of horizontal counter 14 also provides the line count signal which is counted by the vertical counter 16. The vertical counter 16, and vertical digital-to-analog converter 17 are generally similar to the corresponding horizontal counter 14 and converter 15 and will likewise be assumed to consist at least partially of binary counter stages. The counter sections of the vertical counter 16 count horizontal deflection lines in the same manner that the horizontal counter 14 counts clock pulses, and the digital counter output is converted by the digital-to-analog converter 17 to a vertical analog deflection signal.

Figure 2:
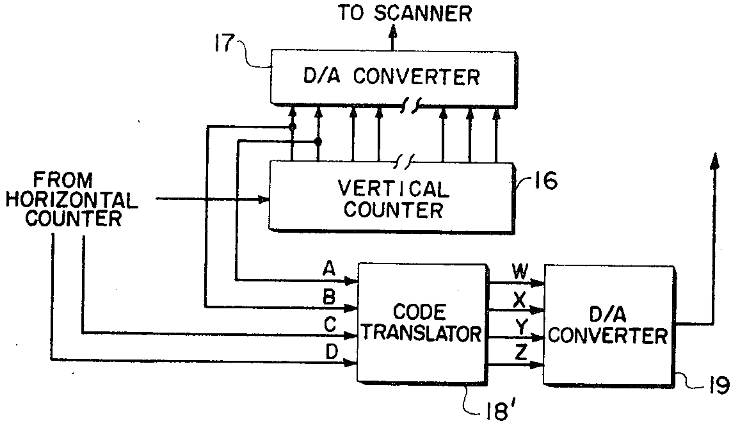

To scan the raster without interlace, the vertical counter 16 and vertical deflection digital-to-analog converter would be connected, as shown in FIG. 2, in a manner similar to the connection of horizontal counter 14 to converter 15. That is to say, the terminal 6a for the least significant output bit of the counter would be connected to the least significant converter input 7*a*, and so on for each successive digit, until the most significant counter output 6*m* is connected to the most significant converter input 7*m*.

If the horizontal counter 14 is a binary counter of *n* stages and the vertical counter has *m* stages, the deflection raster includes a rectangular array of sample points including $2^m$ lines with $2^n$ samples on each line. Assume now, for convenience, that $m$=9 and $n$=7, so that the raster is an array of $2^9 = 512$ lines with $2^7 = 128$ sample points on each line. After every 128th clock pulse, as the horizontal counter 14 returns to zero, the vertical counter increases its count by unity, and the vertical counter eventually returns to zero after it has counted 512 lines.

Let the vertical distance between two adjacent scanning lines be *d*, regardless of whether produced successively in time, as in FIG. 2, or in different scanning fields by means of line interlace. FIG. 1 shows the vertical counter 16 and its associated digital-to-analog converter 17 connected to produce 2:1 line interlace, in conformity with standard television broadcast practice. In order that the successive scan lines produced in a single field shall be spaced apart by a distance 2*d*, the least significant digit from counter 16 is inserted into the second-least-significant input of converter 17, by connecting 6*a* to 7*b*, and succeeding stages are connected in order, i.e., 6*b* to 7*c*, 6*c* to 7*d*, etc., as shown in FIG. 1, until the second most significant output, 6(*m*-1) of the counter 16, is connected to converter input 7*m*. Finally, the most significant output digit, 6*m* is returned to converter input 7*a*, as shown in FIG. 1.

Disregarding for the moment the input 7*a*, it will be seen that the digital-to-analog converter 17 decodes outputs 6*a* (to 6(*m*-1), inclusive, of counter 16, omitting the final output 6*m*. Therefore it produces two vertical deflection sweeps for each complete cycle of the vertical counter 16. Each of these sweeps (count of 256) corresponds to a television field and the full cycle (count of 512) of counter 16 corresponds to a television frame. In the U. S., the frequency of clock 13 would normally be adjusted such that the duration of a field is one-sixtieth sec. and that of a frame one-thirtieth sec. It will be noted that during the first field of each frame the counter output 6*m* is "0" and during the second field of each frame the same output is "1". The output 6*m* therefore, will be referred to as the "field parity count."

Returning again to the converter 17, and still assuming a binary counter 16 with $m$=9 stages, during the first (even-parity) field of a frame the input 7*a* remains 0 but the remaining inputs 7*b* to 7*m* cycle through all possible combinations of values. Therefore, the vertical sweep now produces only 256 lines, positioned at 0, 2*d*, 4*d*, . . . etc., up to 510*d*. In like fashion, during the second (odd-parity) field, the input 7*a* is continually 1, whereby another 256 lines are produced, but spaced at positions *d*, 3*d*, 5*d* . . . etc. up to 511*d*, and therefore interlaced between the lines of the even-parity field.

It should be understood that the maximum count for the two counters 14 and 16 is not limited to the values assumed above and need not even be limited to integral powers of 2. For example, by use of feedback within the counter, one can obtain counts of, say, 100, 323, etc. Furthermore, counters 14 and 16 may even be identical, if desired.

The frame counter 23 of FIG. 1 is shown as a two-stage binary counter, although a one-stage counter, or a counter with three or four stages may also be employed in certain cases, as will become clear subsequently. This unit counts complete frames (corresponding to all transitions of the field-parity count 6*m* from 1 to 0), just as counter 16 counts lines. Although the counters 14, 16 and 23 have been indicated as separate counters, to better explain the functional operation thereof, it is apparent that all three counters can readily be replaced by a single binary counter, with various of its output connected as shown in FIGS. 1 or 2. In the FIG. 1 example previously cited, therefore, a single counter having 7+9+2 = 18 binary stages could be used.

As shown in FIGS. 1 and 2, the horizontal counter output lines 4*a* and 4*b* corresponding, respectively, to the least significant bit and the next least significant bit, are also connected to the code translator 18 and these code translator inputs are labeled D and C, respectively. It will be clear to those skilled in the art that the two-bit number CD is the horizontal count modulo-4.

Likewise, in FIGS. 1 and 2 the output lines 6*m* and 6*a* of vertical counter 16, which correspond to the first and second input lines 7*a* and 7*b* to the vertical analog-to-digital converter 17, are also connected to the code translator 18 and these inputs to the code translator are labeled B and A, respectively. The 2-bit binary number AB is likewise the vertical count modulo-4. The vertical count refers to the vertical position of a scan line and not to the time sequence of generation of the lines; therefore AB is taken from the two least significant inputs of the converter 17, regardless of whether the interlace system of FIG. 1 or the non-interlace system of FIG. 2 is used.

It will readily be seen that any specific combination of the binary digits A, B, C and D is repeated along one scanning line at every fourth sampling point and again repeated on every fourth line of the scanned raster. Furthermore, all sixteen possible combinations of the four binary digits occur within any square of 4×4 sampling points having sides vertical and horizontal with respect to the scanning raster.

In brief, the binary number ABCD varies cyclically in both dimensions of the scanned raster in a manner which may be further described as follows: Consider ABCD to be a natural binary code number varying from 0 to 15 inclusive, the four bits A, B, C and D obtained as shown in FIGS. 1 and 2. It will be seen that in one extreme corner of the raster (conventionally, the upper left-hand corner) a 4×4 square of raster points or matrix has ABCD combinations shown in Table XI in terms of the binary code value of ABCD.

Table XI

| | | | |
|---|---|---|---|
| 0 | 1 | 2 | 3 |
| 4 | 5 | 6 | 7 |
| 8 | 9 | 10 | 11 |
| 12 | 13 | 14 | 15 |

In the absence of the translator 18, ABCD would be furnished directly to the analog-to-digital converter 19 and an ordered dither pattern comprised of pulses of 16 different amplitudes, their distribution corresponding to continued horizontal and vertical repetition of the dither subpattern represented by Table XI, would be combined with the picture by the addition of the dither pulses to the video input in adder means 11.

The function of code translator 18 is to replace the dither subpattern defined by Table XI with one of the preferred nasik subpatterns, in order to obtain the benefits of this invention.

There are well-known means whereby the translator 18 can be arranged to remap the 15 numbers of the 4×4 matrix shown in Table XI so that a unique output number WXYZ occurs for each input ABCD (WXYZ generally, but not necessarily, different from ABCD). Inasmuch as the art of such translator design is well known (as evidenced, for example, by pages 398–402 of Caldwell, "Switching Circuits and Logical Design," published by John Wiley and Sons, Inc. New York, 1958) the translator 18 need not be described in detail. However, for especially preferred matrix embodiments, translation equations may be provided in logic notation, merely as a convenience to persons wishing to form suitable nasik patterns according to the invention. Equivalent means, such as table look-up systems, are also well known to the art, but are considered less convenient.

Suitable translator logic for the dither pattern defined by the nasik matrix shown in Table I is given by equations (1) through (4), viz:

$$Y = B \oplus A \oplus D = B \oplus Z \quad (1)$$

$$Z = A \oplus D \quad (2)$$

$$W = D \oplus B \oplus C = D \oplus Z \quad (3)$$

$$X = B \oplus C \quad (4)$$

The symbol $\oplus$ denotes the "exclusive or" logical operation.

The translation logic for the nasik matrix of other species shown in Table V is similar, except that the letters *W*, *X*, *Y* and *Z* are all interchanged with respect to the right-hand sides of equations (1) through (4).

All four dither patterns of Tables I through IV can be generated in sequence by combining the inputs A, B, C and D in the translator 18 with two additional inputs, F and G, where F is the least significant bit, and G the next bit of the frame counter 23, using the following logic:

$$W = B \oplus C \oplus D \oplus F \quad (5)$$

$$X = B \oplus C \oplus G \quad (6)$$

*Y* and *Z* being obtained according to Equations (1) and (2) above. As the binary frame count *FG* takes on the successive values 00, 01, 10, 11, the dither patterns for successive frames of the picture correspond to Tables I, II, III and IV successively. Additional outputs *H* and/or *I* (not shown) from counter 23 may also be utilized, in similar fashion, to modify equations (1) and (2) respectively, whereby *Y* and/or *Z* also change, resulting in an even longer sequence of alternating dither patterns.

If only two alternating dither patterns are required, those of Tables I and II comprise a suitable preferred pair, as previously stated. To obtain this pair, the bit *G* from the counter may be dispensed with and the *W* input to the converter 19 obtained according to Equation (5), which is a function of *F. X*, *Y* and *Z* would be obtained once more according to Equations (2), (3) and (4).

The above logic equations provide both fixed and frame-variant dither with $Q$=16. For $Q$=8 dither, one preferred set of four patterns for variation with the frame count is defined by Tables VII through X. This set can be obtained from the translator already described for the four patterns of Tables I through IV, provided that output Z is disconnected. It may at first appear that the dither matrix then includes the eight even numbers 0, 2, . . . up to 14, instead of 0, 1, . . . 7. To conform to our notational system, however, the even numbers should be divided by two since we now have $Q$=8, and $S/8$ is twice as large as $S/16$, where $S$ is the size of a quantizer step. Thus, whenever the ordered dither pulses applied to the adder 11 are adjusted to have the proper range of amplitudes when $Q$=16 and the *Z* input is used, they are also adjusted for $Q$=8 with the input *Z* omitted, except for a very minor bias adjustment to be described later.

Only two preferred alternating dither patterns with $Q=8$ are obtained by omitting the lead $G$ from counter 23. Likewise, one pattern which does not vary with time may be obtained by omitting both inputs F and G, exactly as when $Q=16$. (See Eq. (1) to (4)).

It can easily be verified that $W$, $X$, $Y$ and $Z$ may be permuted with respect to the four inputs of the converter 19, and any of the eight variables $A$, $B$, $C$, $D$, $W$, $X$, $Y$, $Z$ may be negated, but the pattern will remain a nasik pattern. However, not all of the patterns obtained by such modifications will be suitably oriented to minimize flicker when interlace is used. Equations (1) through (6) insure the optimum orientation for 2:1 line interlace, when connections are as shown in the drawings.

To insure that the nasik dither pattern always corresponds to the preferred dither matrices of tables I–IV and VII–X, it is preferred that the digital-to-analog converter 19 weight the four inputs $W$, $X$, $Y$ and $Z$ as follows:

$$W = S/2$$

$$X = S/4$$

$$Y = S/8$$

$$Z = S/16$$

where $S$ is the quantizer step interval. A fixed negative bias is preferably also added in the converter, such that the mean value of dither is zero. It can be shown that the required value of bias is $S\ (1-Q/2Q)$. This is $-(15/32)\ S$ when $Q=16$ and $-\ (14/32)\ S$ (almost the same as $-\ (15/32)\ S$) when $Q=8$. The input Z is assumed to be absent (or to remain at 0) when $Q=8$. These preferred weights and biases assure that the dither amplitude values will be uniformly distributed in a range of one quantizer step, and have a mean value of zero. It will, of course, be clear that non-preferred values, particularly for the bias, can also be used, with only minor effect. Use of another value of bias (or no bias) in the converter 19 would only cause the mean luminance of the reproduced picture to be different from that of the scanned picture, and even this effect could be compensated for elsewhere in the system.

The quantizer 12 is preferably a uniform quantizer which provides relatively few discrete values to represent all possible values of the sum of the video and dither signals. Optionally, the quantizer may be synchronized with the output of the clock 13 to resample the sum of video and dither.

In one embodiment of the invention, the quantizer is an analog-to-digital converter providing a $k$=bit word for each quantized sample, where $k$ is relatively small, say 2 or 3. The unit 12 has been labelled "Quantizer and Coder" to indicate this embodiment. The receiver for this embodiment first decodes each $k$-bit word in requantizer and decoder 25 to provide a pulse having $2^k$ possible amplitude values, and a train of such pulses constitutes the video signal which is displayed on an essentially conventional television receiver 26, similar to ordinary receivers for analog video. Means for synchronization of the receiver sweep circuits with the raster scanning system in the transmitter, have been omitted to clarify the drawing and because such means are independent of the invention and entirely in accordance with prior art.

In a slightly different embodiment of the invention, the quantizer is merely any non-linear network of the prior art, (typically a network of diodes), which has the staircase-shaped transfer characteristic required for uniform quantization of an electrical signal. (Such quantizing networks are sometimes used as part of analog-to-digital converters). The number of discrete outputs provided is preferably small, such as 4 or 6. By this means, successive pulses corresponding to the sum of the dither signal and the video are quantized and may then be transmitted as coarsely quantized pulses having, only say, 4 or 6 possible levels. Such pulses can conveniently be sent over many existing communications facilities, since the required bandwidth is less than when an analog-to-digital converter transmits $k$-bit words serially. On the other hand, the received pulses can be requantized and/or resampled at the receiver in the unit 25 which is now only an optional regenerator to remove noise or interference, if necessary, and either the stream of received pulses or pulses regenerated by requantization and/or resampling, constitute a suitable video signal for the above-referenced, essentially conventional receiver.

It will be clear to those skilled in the art that either of the embodiments of the quantizer means 12 provides a signal which is characteristic of digital signalling and which can therefore be regenerated or encrypted, as required in many systems.

Certain of the claims express numbers in binary notation for a clearer understanding of the scope of the invention. It will be recalled that the integers 0 to 15, ordinarily written with the base ten (decimal notation) can also be written with the base two (binary notation), according to the following table of correspondence:

TABLE XII

| Decimal | Binary |
|---|---|
| 0 | 0000 |
| 1 | 0001 |
| 2 | 0010 |
| 3 | 0011 |
| 4 | 0100 |
| 5 | 0101 |
| 6 | 0110 |
| 7 | 0111 |
| 8 | 1000 |
| 9 | 1001 |
| 10 | 1010 |
| 11 | 1011 |
| 12 | 1100 |
| 13 | 1101 |
| 14 | 1110 |
| 15 | 1111 |

It follows that the matrix of Table I, expressed in binary notation is as shown in Table XII.

TABLE XIII

| | | | |
|---|---|---|---|
| 0000 | 1011 | 1100 | 0111 |
| 1110 | 0101 | 0010 | 1001 |
| 0011 | 1000 | 1111 | 0100 |
| 1101 | 0110 | 0001 | 1010 |

This invention is not necessarily limited, as shown and described in the specification, since other variations may be possible within the scope of the following claims.

What is claimed is:

1. A system for transmission and reception of picture information comprising means for generating a two-dimensional ordered dither pattern coextensive in area with said picture, said pattern comprising an array of elements having a plurality of discrete amplitude levels, said elements being orthogonally arranged and comprising a dither subpattern of said elements which is repeated several times horizontally and vertically over the entire area of said picture, every horizontal group of four consecutive elements of said pattern having the same sum, every vertical group of four consecutive elements of said pattern having said same sum, and every group of four consecutive elements of said pattern disposed in a direction parallel to a diagonal of said subpattern having said same sum, means for adding said ordered dither pattern to said picture, and means for quantizing the sum of said picture and said ordered dither pattern.

2. A system for transmission and reception of picture information according to claim 1 wherein said picture is a frame of a moving picture comprising two fields related by two to one line interlace, and wherein said elements of said subpattern can be represented by up to four binary digits, and the three most significant binary digits appear the same number of times on odd and even horizontal rows of said matrix.

3. The system of claim 1 wherein said ordered dither subpattern corresponds to a nasik matrix of the species

| | | | |
|---|---|---|---|
| 0000 | 1011 | 1100 | 0111 |
| 1110 | 0101 | 0010 | 1001 |
| 0011 | 1000 | 1111 | 0100 |
| 1101 | 0110 | 0001 | 1010 |

including any number of successive reflections thereof about axes passing through any four linearly arranged elements, where the geometrical distribution of amplitudes of the elements of said dither subpattern corresponds to the geometrical distribution of values of the numbers in said matrix, wherein said numbers are expressed herein in binary form and all of which numbers may be altered by algebraic addition of the same constant.

4. The system of claim 3 wherein said ordered dither subpattern is any nasik matrix derived from the species therein by deleting from all numbers consistently any of the four bits of a given binary significance.

5. The system of claim 1 wherein said ordered dither subpattern corresponds to a nasik matrix of the species

| | | | |
|---|---|---|---|
| 0000 | 1101 | 1010 | 0111 |
| 1110 | 0011 | 0100 | 1001 |
| 0101 | 1000 | 1111 | 0010 |
| 1011 | 0110 | 0001 | 1100 |

including any number of successive reflections thereof about axes passing through any four linearly arranged elements, where the geometrical distribution of amplitudes of the elements of said dither subpattern corresponds to the geometrical distribution of values of the numbers in said matrix, wherein said numbers are expressed herein in binary form and all of which numbers may be altered by algebraic addition of the same constant.

6. The system of claim 5 wherein said ordered dither subpattern is any nasik matrix derived from the species therein by deleting from all numbers consistently any of the four bits of a given binary significance.

7. The system of claim 1 wherein said picture is a moving picture and further including means for varying said ordered dither pattern as a function of time.

8. The system of claim 7 wherein two dither patterns are alternated said dither pattern being defined by two dither matrices so related that the most significant digits of all of the binary numbers of one of the matrices are the complements of the most significant digits of all corresponding binary numbers of the other matrix.

9. Apparatus for transmission and reception of information representative of a picture comprising: means for sampling and orthogonally scanning said picture to provide a train of video pulses which have amplitude levels representing the brightness values of corresponding scanned elemental portions of the picture; means for generating an ordered repetitive sequence of $p$ sets of $2^n$ dither pulses, where $n$ is any integer from 1 to 4, for each complete scan of said picture which is synchronized with the video pulses derived during scanning of said elemental portions of the picture; said scanning means comprising a horizontal deflection counter establishing a binary number CD and a vertical deflection counter establishing a binary number AB, the numbers CD and AB being respectively the horizontal and vertical counts modulo-4; said means for generating comprising a code translator for deriving from the binary digits $A$, $B$, $C$ and $D$ at least one of four binary digits W, X, Y and Z according to the following logical equations:

$$W = B \oplus C \oplus D$$

$$X = B \oplus C$$

$$Y = A \oplus B \oplus D$$

$$Z = A \oplus D$$

the derived binary digits, taken in any order, representing a binary number; digital-to-analog converter means for converting successive and binary numbers to a repetitive series of analog dither pulses; means for adding said synchronized dither pulses and video pulses; and quantizing means having a quantizer step S for quantizing the sum of said dither pulses and video pulses.

10. Apparatus according to claim 9 wherein at least one of the binary digits $W$, $X$, $Y$ and $Z$ is replaced by its binary complement.

11. Apparatus according to claim 9 wherein said picture is a moving picture and one of said binary digits, $W$, $X$, $Y$ and $Z$ alternates with its binary complement as a function of time.

12. Apparatus according to claim 9 wherein said picture is a frame of a motion picture comprising two fields related by two to one line interlace wherein the digits of said binary number are taken in such order that all but the digit of the fourth ranking significance, if any, occur with equal frequency during each of said interlaced fields.

* * * * *

UNITED STATES PATENT OFFICE
CERTIFICATE OF CORRECTION

Patent No. 3,739,082 Dated June 12, 1973

Inventor(s) Bernard Lippel

It is certified that error appears in the above-identified patent and that said Letters Patent are hereby corrected as shown below:

Column 10, line 7, cancel the parenthesis before the word "to";
Column 12, equation 3, change that portion reading "Z" to -- X --;

Signed and sealed this 6th day of August 1974.

(SEAL)
Attest:

McCOY M. GIBSON, JR.
Attesting Officer

C. MARSHALL DANN
Commissioner of Patents